(12) United States Patent
Pearson et al.

(10) Patent No.: US 7,580,247 B1
(45) Date of Patent: Aug. 25, 2009

(54) DOUBLE BUS BAR LOAD CENTER

(76) Inventors: Dave Pearson, 1973 Clifford Rd., Palo, IA (US) 52324; William J. Broghammer, 3314 King Dr. SW, Cedar Rapids, IA (US) 52404

( * ) Notice: Subject to any disclaimer, the term of this patent is extended or adjusted under 35 U.S.C. 154(b) by 0 days.

(21) Appl. No.: 12/100,963

(22) Filed: Apr. 10, 2008

(51) Int. Cl.
*H02B 1/20* (2006.01)
*H02B 5/00* (2006.01)

(52) U.S. Cl. .............. 361/624; 361/611; 361/622; 361/627; 361/634; 361/636; 174/68.2; 174/149 B; 218/43

(58) Field of Classification Search ......... 361/602–605, 361/611, 622–627, 634–637, 641, 652–656, 361/673; 174/68.2, 129 B, 149 B, 88 B, 174/133 B, 171; 218/2, 7, 43, 157; 200/48 R, 200/43.15, 294, 296, 306; 439/218, 884, 439/82, 83, 79, 115, 116, 209
See application file for complete search history.

(56) References Cited

U.S. PATENT DOCUMENTS

| | | | | |
|---|---|---|---|---|
| 2,632,039 | A * | 3/1953 | Hammerly et al. | 361/650 |
| 3,120,628 | A * | 2/1964 | Edmunds | 361/635 |
| 3,263,132 | A * | 7/1966 | Bangert, Jr. | 361/635 |
| 3,309,580 | A * | 3/1967 | Jacobs et al. | 361/635 |
| 3,402,328 | A * | 9/1968 | Gryctko | 361/635 |
| 3,412,291 | A * | 11/1968 | Stokes | 361/636 |
| 3,995,103 | A * | 11/1976 | Gehrs et al. | 174/72 B |
| 4,002,388 | A * | 1/1977 | Menocal | 439/884 |
| 4,079,439 | A * | 3/1978 | Coles et al. | 361/637 |
| 4,157,582 | A * | 6/1979 | Myers | 361/636 |
| 4,198,107 | A * | 4/1980 | Luke et al. | 439/218 |
| 4,809,153 | A | 2/1989 | Bremer et al. | 363/141 |
| 5,206,461 | A | 4/1993 | Genzel et al. | 174/88 B |
| 5,450,282 | A | 9/1995 | Webber et al. | 361/637 |
| 6,813,142 | B1 * | 11/2004 | Seff | 361/637 |
| 7,224,577 | B2 * | 5/2007 | Wiant et al. | 361/605 |

OTHER PUBLICATIONS

Description of I-Line Circuit Breaker Panelboards, Jul. 1992 (12 pages).
Description of NEHB Panelboards, Jul. 1992 (8 pages).
Catalog of GE Residential Products, 1998 (58 Pages).

* cited by examiner

*Primary Examiner*—Michael V Datskovskiy

(57) ABSTRACT

A load center system includes a primary bus bar with primary stabs for receiving a first type of circuit breaker, the primary stab extending from a primary base portion of the primary bus bar. A secondary bus bar with a secondary base portion and secondary stabs is coupled to the primary bus bar in a generally overlapping position, for receiving a second type of circuit breaker. Both the primary and secondary bus bars can be formed from stamping. By utilizing bus bars with base portions, the primary and secondary bus bars together provide for ease of assembly, and structural integrity, while allowing either of the first type of circuit breaker and the second type of circuit breaker to be coupled to the load center.

12 Claims, 5 Drawing Sheets

DOUBLE BUS BAR LOAD CENTER

FIELD OF THE INVENTION

This invention is directed generally to electrical load centers, and, more particularly, to a load center having a double bus bar for receiving circuit breakers of different sizes.

BACKGROUND OF THE INVENTION

Electrical systems in residential, commercial and industrial applications usually include a load center (also referred to as a panelboard) for receiving electrical power from a utility source. The power is connected to the load center via line bus bars and neutral bus bars. The electrical power is delivered from the load center to designated branch circuits through line and neutral conductors supplying one or more loads. Typically, various types of protective devices are mounted to the bus bars of the load center to protect the branch circuits from hazardous electrical conditions and reduce the risk of injury, damage or fires.

Standard circuit breakers are one type of protective device for protecting the branch circuits from certain hazardous electrical conditions. In particular, standard circuit breakers are designed to trip open and interrupt an electric circuit in response to detecting overloads and short circuits. Overload protection is provided by a thermal element which, when heated by the increased current, will cause the circuit breaker to trip and interrupt the power. This can occur when too many loads draw power from the same branch circuit at the same time, or when a single load draws more power than the branch circuit is designed to carry. Short circuit protection is provided by an electromagnetic element that trips when sensing high current flow.

One problem associated with some current load centers is that they include a bus bar assembly that fails to accommodate different sized circuit breakers. For example, this type of bus bar assembly will only accept one-inch circuit breakers or only half-inch circuit breakers, but not both. This type of bus bar assembly is inflexible and undesirable for numerous electrical applications.

Although some current bus bar assemblies try to address the above stated problem, this type of bus bar assemblies can be unreliable and can provide poor quality. For example, one bus bar assembly includes separate pairs of half-inch breaker stabs at multiple locations along a bus bar by either brazing or staking the half-inch breaker stabs to corresponding one-inch breaker stabs. This type of connection, either using a braze or a mechanical stake, inherently may introduce a problem-prone design that increases the opportunity for faulty connections (e.g., poor joining technique or material). Furthermore, this type of connection may fail over time due to stresses caused by normal use of circuit breakers (e.g., tripping the circuit breaker, replacing the circuit breaker, etc.). Additionally, the use of brazing and/or mechanical stakes can increase manufacturing costs and time.

What is needed, therefore, is a double bus bar assembly that addresses the above-stated and other problems.

SUMMARY OF THE INVENTION

In an implementation of the present invention, a load center system includes a load center and a primary bus bar coupled to the load center. The primary bus bar has at least one primary stab for receiving a first type of circuit breaker, the primary stab extending from a primary base portion of the primary bus bar via a primary leg. A secondary bus bar is coupled to the primary bus bar in a generally overlapping position, the secondary bus bar having at least one secondary stab for receiving a second type of circuit breaker. The secondary stab extends from a secondary base portion of the secondary bus bar via a secondary leg, the primary stab and the secondary stab being positioned such that either of the first type of circuit breaker and the second type of circuit breaker can be coupled to the load center.

In an alternative implementation of the present invention, a method of assembly for a load center includes providing a load center and coupling a primary bus bar to the load center. The primary bus bar has a primary base portion from which a primary stab extends via a primary leg, the primary stab being adapted to receive a first type of circuit breaker. A secondary bus bar is coupled to the primary bus bar in a generally overlapping position, the secondary bus bar having a secondary base portion from which a secondary stab extends via a secondary leg. The primary stab and the secondary stab are positioned such that either of the first type of circuit breaker and the second type of circuit breaker can be coupled to the load center.

In another alternative implementation of the present invention, a load center system is adapted for receiving multiple types of circuit breakers. The load center system includes a load center, a first assembly of a double bus bar arrangement that is coupled on a first side of the load center, and a second assembly of the double bus bar arrangement coupled on a second side of the load center. The first assembly includes a primary bus bar having a plurality of primary stabs, each of the plurality of primary stabs including a single stab for receiving a first circuit breaker. The single stab extends from a primary base portion of the primary bus bar via a primary leg. The first assembly further includes a secondary bus bar positioned generally in an overlapping position with the primary bus bar, the secondary bus bar having a plurality of secondary stabs. Each of the plurality of secondary stabs includes a pair of stabs for receiving a pair of second circuit breakers, the pair of stabs extending from a secondary base portion of the secondary bus bar via a secondary leg. The pair of stabs is centered about the single stab of the primary bus bar. The second assembly includes a corresponding primary bus bar and a corresponding secondary bus bar that are generally symmetrical mirror images of the primary bus bar and the secondary bus bar of the first assembly.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The invention may best be understood by reference to the following description taken in conjunction with the accompanying drawings, in which:

FIG. 2b is a cross-sectional view along line 2B-2B of the double bus bar assembly of FIG. 2a.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to include all alternatives, modifications and equivalent arrangements as may be included within the spirit and scope of the invention as defined by the appended claims.

Figure 1:
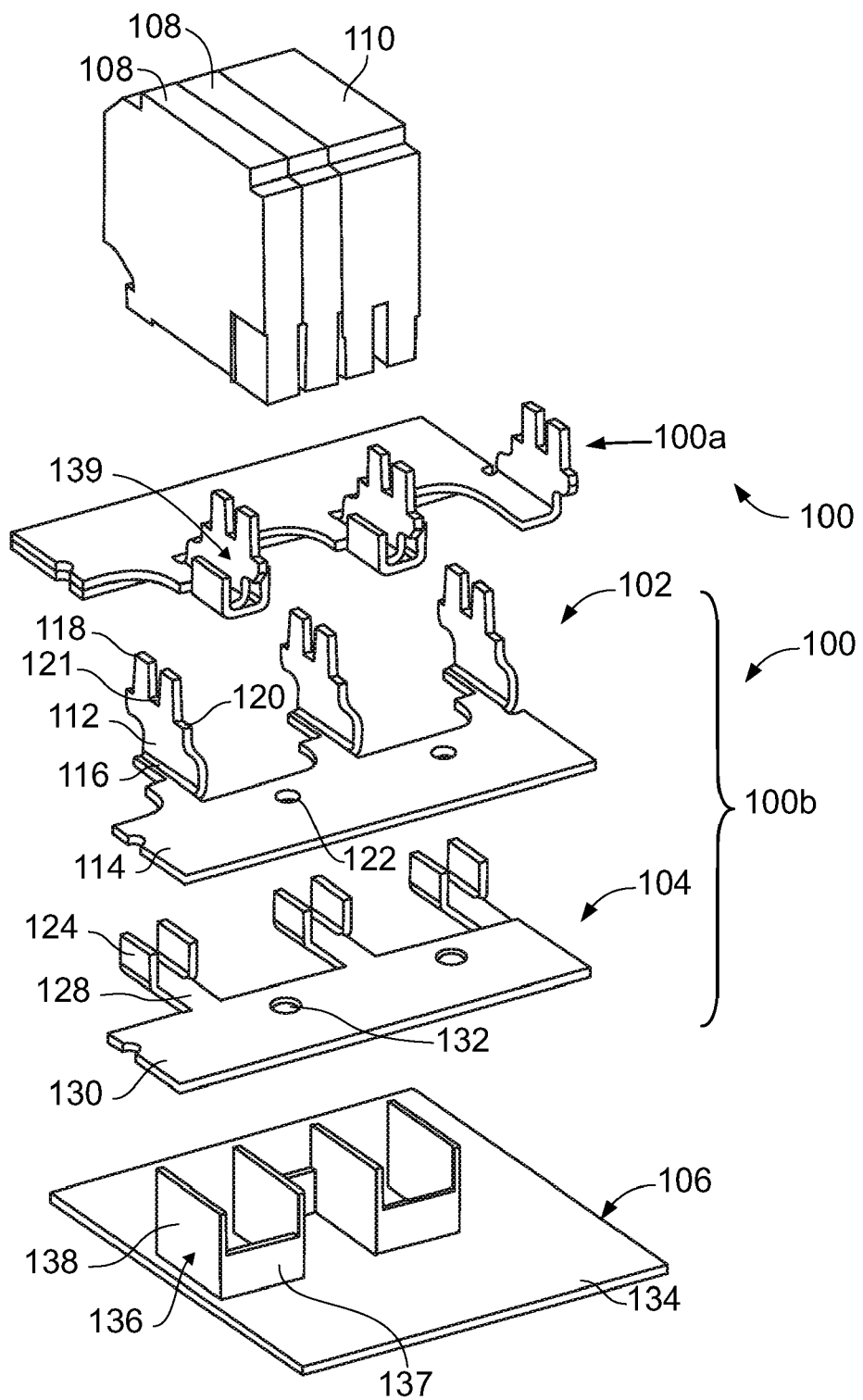
FIG. 1 is an exploded view of the double bus bar assembly, according to one implementation.

Referring to FIG. 1, two double bus bar assemblies collectively 100 (an assembled left double bus bar assembly 100a and an exploded right double bus bar assembly 100b) for an electrical load center include generally the same features, except that the double bus bar assemblies 100 are offset mirror images of each other and can be interwoven. As such, reference is made generally to features of only one of the double bus bar assemblies 100, with the understanding that the other one of the double bus bar assemblies 100 includes the same (symmetrically formed) features. According to an alternative embodiment, only one of the double bus bar assemblies 100 is mounted in the load center.

The right double bus bar assembly 100b includes a primary bus bar 102 and a secondary bus bar 104. The right double bus assembly 100b is optionally mounted to a load center interior insulator plate 106, which is mounted in a typical load center. As described in more detail below, the right double bus bar assembly 100b is adapted for receiving circuit breakers of different sizes. For example, the right double bus bar assembly 100b is adapted for receiving, in the same space, either two half-inch circuit breakers 108 or a single one-inch circuit breaker 110. In other embodiments, other sizes of circuit breakers can be received.

The primary bus bar 102 includes one or more primary stabs 112 that extend from a primary plate (or base) 114. Each primary stab 112 is connected to the primary plate 114 via a corresponding primary leg 116. The primary stab 112 extends upwards relative to the primary plate 114 and is, optionally, offset to one side of the corresponding primary leg 116. As another optional feature, an upper portion of the primary stabs 112 is split into two projections 118, each of which is offset from a lateral edge of the respective primary stab 112 by a corresponding notch 120. Furthermore, the two projections 118 are separated by a bridging portion 121. Each projection 118 is designed to receive a single one-inch circuit breaker 110, or tandem half-inch circuit breakers (e.g., two single-pole circuit breakers with a single connection to the bus bar). The primary plate 114 includes one or more primary holes 122 for fastening the primary bus bar 102 to other components, such as the secondary bus bar 104.

The secondary bus bar 104 includes one or more sets of secondary stabs 124, each set 124 including two stabs that extend upwards from a secondary leg 128. The secondary leg 128 extends from a secondary plate (or base) 130 of the secondary bus bar 104. The secondary plate 130 includes one or more secondary holes 132 for fastening the secondary bus bar to other load center components.

According to one embodiment, the primary bus bar 102 and the secondary bus bar 104 are both made from single aluminum part. For example, each set of secondary stabs 124 is a formed aluminum stamping.

The double bus bar assembly 100 is assembled such that the primary plate 114 is generally overlapping with the secondary plate 130. According to one embodiment, the primary plate 114 and the secondary plate 130 are in contact with each other, and the primary holes 122 line up with the secondary holes 132. The two stabs of the secondary set of stabs 124 are positioned symmetrically about a corresponding primary stab 112, having the primary stab 112 generally centered between the two secondary stabs.

The insulator plate 106 includes a base plate 134 on which one or more insulator barriers 136 are located. Each insulator barrier 136 includes a connecting plate 137 and a pair of side plates 138. The insulator barrier 136 separates a stab combination 139, which consists of a primary stab 112 and a set of secondary stabs 124, from an adjacent stab combination 139.

Figure 3:
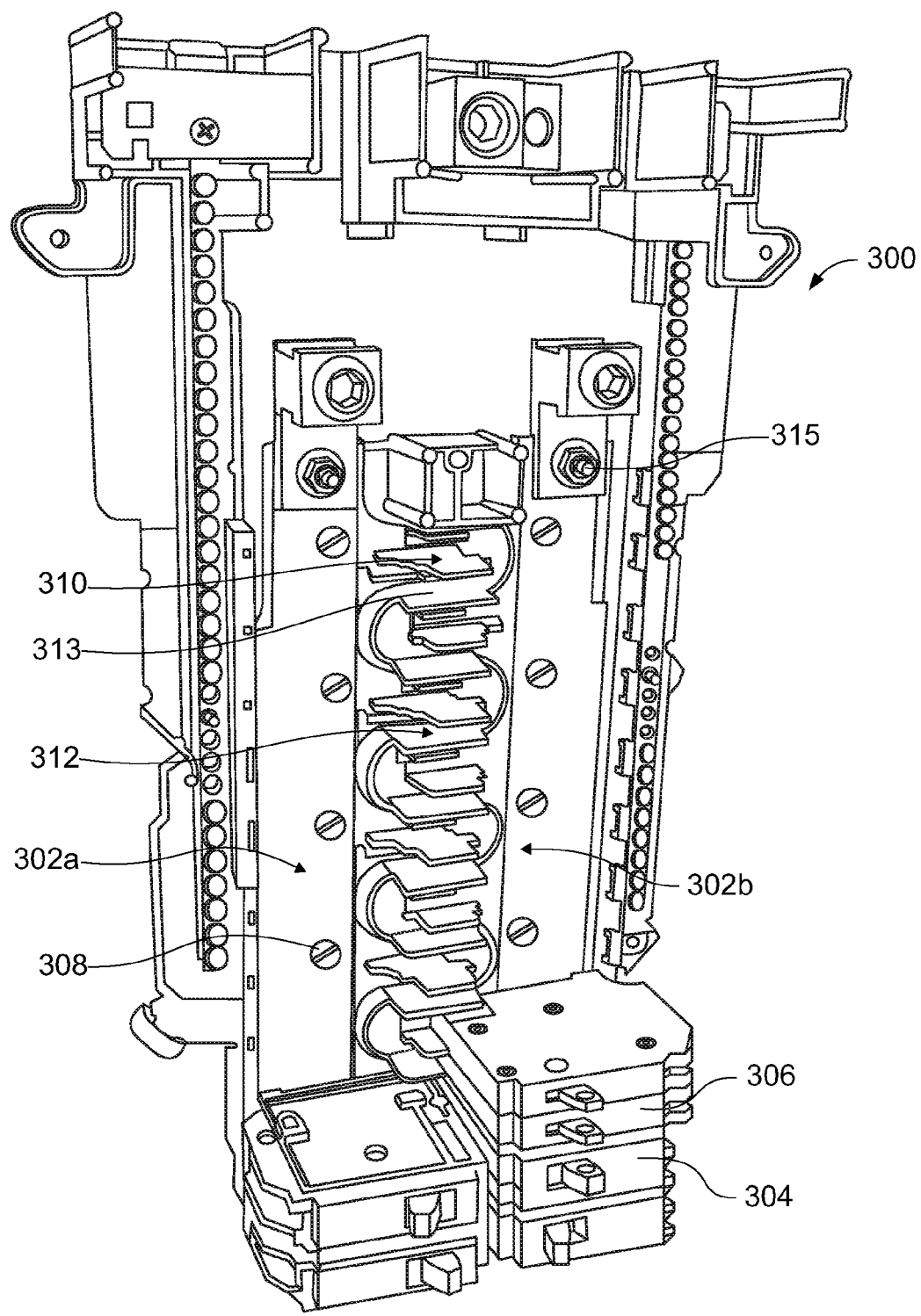
FIG. 3 is a perspective view of a load center having a double bus bar assembly, according to yet another implementation.
Figure 4:
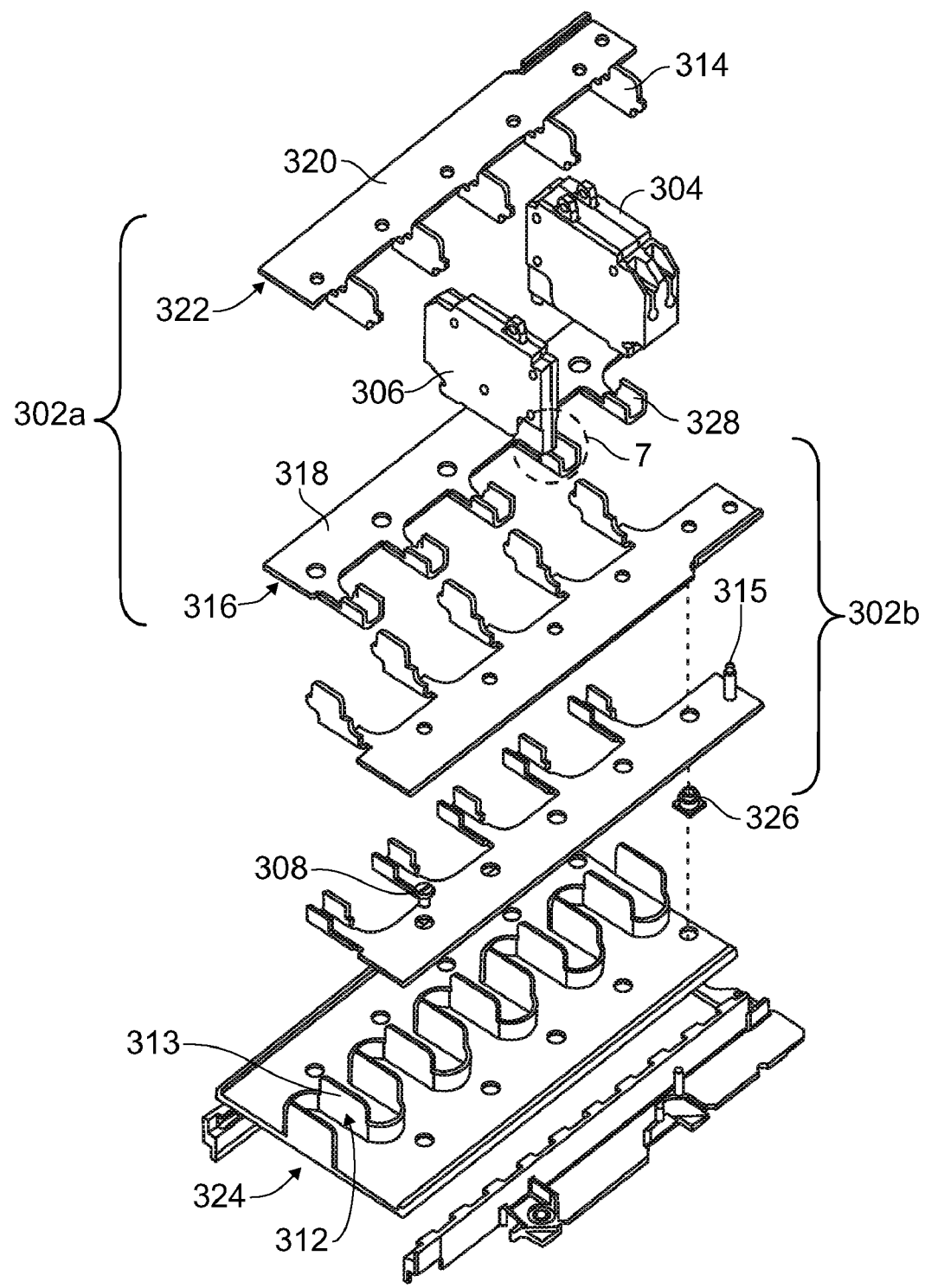
FIG. 4 is an exploded view representing the double bus bar assembly of FIG. 3.

According to alternative embodiments, a steel stud 315 (which is illustrated in FIGS. 3 and 4) may serve as the mechanical interface between the primary bus bar 102 and the secondary bus bar 104. For example, the base plate 134 can support the steel stud 315. Optionally, the steel stud 315 can be a separate component press-fitted with splines on one end and threaded to accept a connection nut on the other end.

Figure 2A:
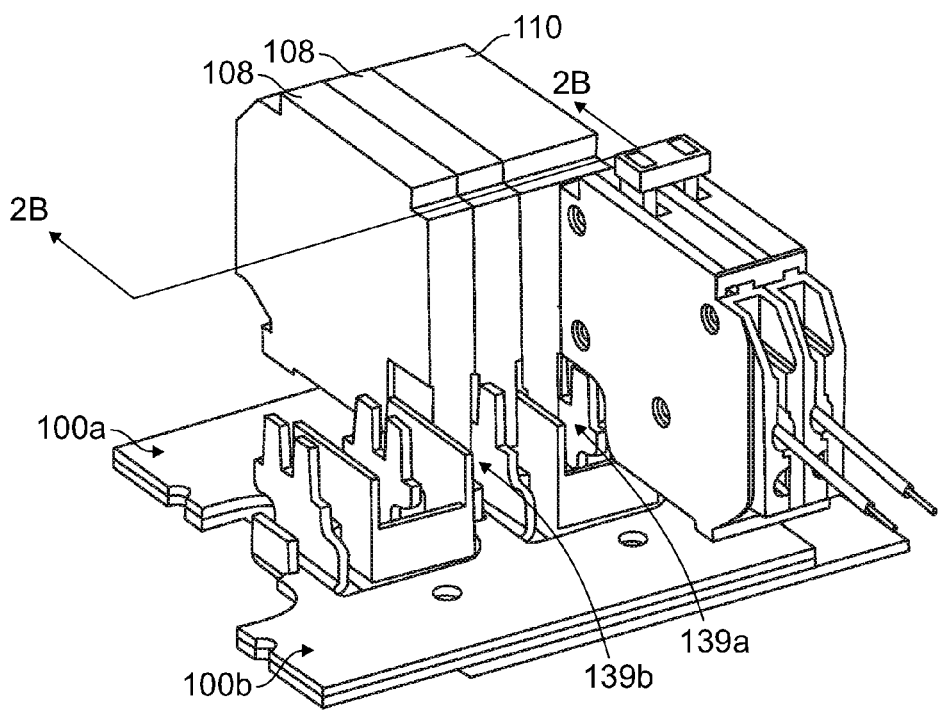
FIG. 2a is a perspective view of a double bus bar assembly, according to another implementation.
Figure 2B:
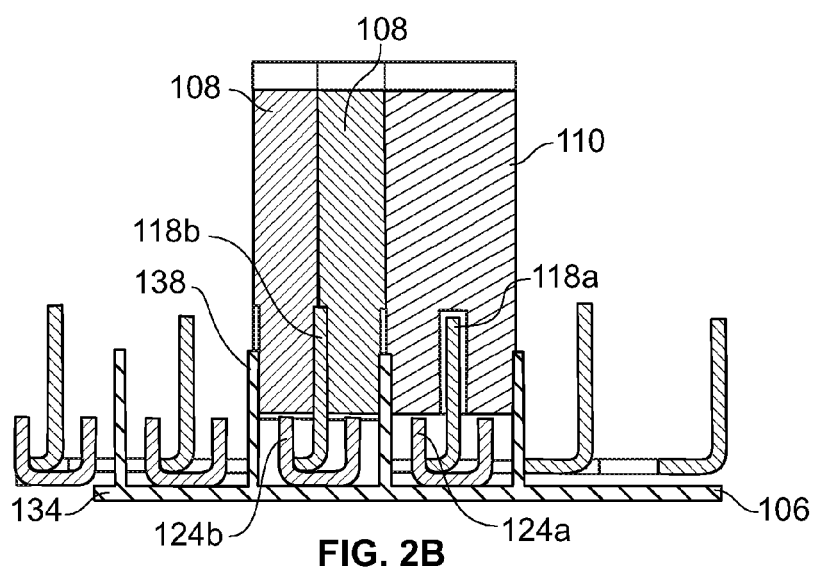

Referring to FIGS. 2a-2b, the two double bus bar assemblies 100a, 100b are shown assembled and mounted on the insulator plate 106. The double bus bar assemblies 100a, 100b are adapted generally to receive any combination of two half-inch circuit breakers 108 and one-inch circuit breakers 110. For example, two half-inch circuit breakers 108 are received by a stab combination 139b of the right double bus bar assembly 100b (although the circuit breakers are mounted on the side of the left double bus bar assembly 100a), and a single one-inch circuit breaker 110 is mounted on a stab combination 139a of the left double bus bar assembly 100a (with the circuit breaker being mounted on the side of the left double bus bar assembly 100a).

Of course, either a single one-inch circuit breaker 110 or two half-inch circuit breakers 108 can be received by the same stab combination 139a as the one receiving the shown one-inch circuit breaker 110, but mounted on the side of the right double bus bar assembly 100a. Similarly, either a single one-inch circuit breaker 110 or two half-inch circuit breakers 108 can be received by the same stab combination 139b as the one receiving the shown two half-inch circuit breakers 108, but mounted on the side of the right double bus bar assembly 100b making a double row of circuit breakers in the load center.

One exemplary advantage of the double bus bar assembly 100 is that it provides flexibility and reduces manufacturing processes associated with installing either a single one-inch circuit breaker 110 or two half-inch circuit breakers 108 in the same load center, and, more specifically, in the same stab combination 139 (consisting of a primary stab 112 and a set of secondary stabs 124). Typical load centers can receive only one size of a circuit breaker. By combining the primary stab 112 with a set of secondary stabs 124, a load center does not require later modification or replacement (which can be costly, time-consuming, and even impossible) for receiving a different-sized circuit breaker. For example, if a load center is initially designed to accept only half-inch circuit breakers, it may be an expensive endeavor to modify the load center to later accept one-inch circuit breakers with AFCI or GFCI functionality.

Another advantage is directed to increased reliability and longevity of electrical contact between the primary stab 112 and the set of secondary stabs 124. Under normal conditions, circuit breakers are occasionally replaced (e.g., when upgrading electrical service) or switched between on and off positions (e.g., when the circuit breaker is tripped due to detection of overcurrent conditions). Based on the exemplary design of the double bus bar assembly 100, the downward forces generated by installation force would actually increase the contact between the set of secondary stabs 124 and the primary stab 112 because the downward forces would press the primary plate 114 towards the secondary plate 130.

Referring to FIG. 3, an electrical load center 300 includes a left double bus bar assembly 302a and a right double bus bar assembly 302b. A plurality of one-inch circuit breakers 304 and a plurality of half-inch circuit breakers 306 are mounted in the load center 300, in a tandem arrangement via the double bus bar assemblies 302a, 302b. The double bus bar assemblies 302a, 302b are mounted to the load center 300 via a plurality of screws 308 or heat stakes. Adjacent stab combinations 310 can be separated by a phase barrier 312, which includes wider or taller portions 313, to maintain through-air and over-surface insulation between the bus bars of opposite polarity.

Referring to FIG. 4, the double bus bar assemblies 302a, 302b are similar to the double bus bar assemblies 100a, 100b described above in reference to FIGS. 1-2b, with some modifications. For example, one exemplary modification is that a primary stab 314 does not include two projections like the projections 118. Instead the primary stab 314 forms a single projection (or a single stab) unto which two opposing one-inch circuit breakers 304 can be received. Another exemplary modification is that a secondary bus bar 316 has a secondary plate 318 that is narrower than a primary plate 320 of a primary bus bar 322. The narrower secondary plate 318 allows the secondary bus bar 316 to fit inside a support feature of an interior branch base 324.

The double bus bar assemblies 302a, 302b are mounted to the branch base 324 with a plurality of heat stakes 326, through which corresponding screws 308 are inserted. The half-inch circuit breaker 306 includes a jaw-to-bus bar interface (shown in more detail in FIG. 5) for receiving a secondary stab 328. The one-inch circuit breakers 304 can be single pole circuit breakers or two-pole circuit breakers.

Figure 5:
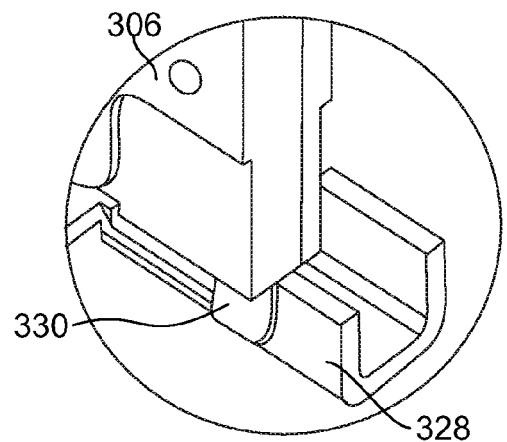
FIG. 5 is an enlarged perspective view representing an interface between a half-inch circuit breaker and a bus bar of the double bus bar assembly of FIG. 3.

Referring to FIG. 5, the half-inch circuit breaker 306 includes a jaw interface 330 that is adapted to receive the secondary stab 328 when mounting the half-inch circuit breaker 306 to the load center 300. The jaw interface 330 serves both as a mechanical and electrical interface.

Figure 6:
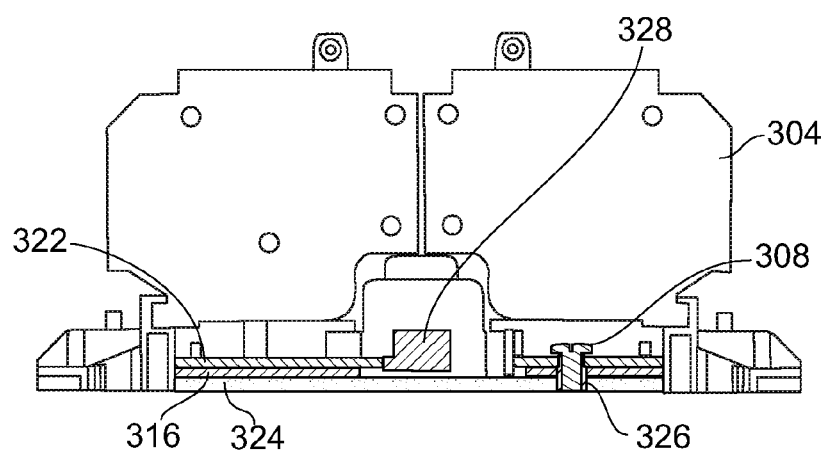
FIG. 6 is a side partial cross-sectional view representing the double bus bar assembly of FIG. 3.
Figure 7:
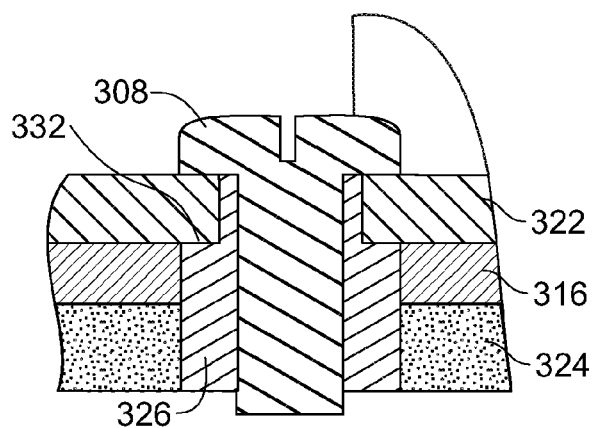
FIG. 7 is an enlarged cross-sectional view representing assembly of a primary bus bar to a heat stake.
Figure 8:
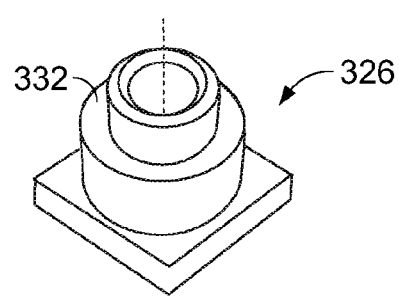
FIG. 8 is a perspective view of a heat stake included in the double bus bar assembly of FIG. 3.

Referring to FIGS. 6-8, the screw 308 mechanically fastens the primary bus bar 322 to the secondary bus bar 316 and to the branch base 324 via the heat stake 326. The heat stake 326 includes a shoulder feature 332 for supporting the primary bus bar 322. Thus, according to one embodiment, the screw 308 and the heat stake 326 couple the double bar bus assemblies 302a, 302b to the load center 300 in a layered configuration. Alternatively, the plates can be mechanically fastened together with heat stakes, instead of using the screw 308.

While particular embodiments, aspects, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims. For example, the double bus bar assembly can be adapted for a three-phase load center or panel board.

What is claimed is:

1. A load center system comprising:
   a load center;
   a primary bus bar coupled to the load center and having at least one primary stab for receiving a first type of circuit breaker, the primary stab extending from a primary base portion of the primary bus bar via a primary leg; and
   a secondary bus bar coupled to the primary bus bar in a generally overlapping position, the secondary bus bar having at least one secondary stab for receiving a second type of circuit breaker, the secondary stab extending from a secondary base portion of the secondary bus bar via a secondary leg, the primary stab and the secondary stab being positioned such that either of the first type of circuit breaker and the second type of circuit breaker can be coupled to the load center.

2. The load center system of claim 1, wherein the secondary stab is a stab set including a pair of stabs that are centered about the primary stab.

3. The load center system of claim 1, wherein at least one of the primary stab and the secondary stab is a formed stamping.

4. The load center system of claim 1, wherein a mechanical interface between the primary bus bar and the secondary bus bar includes a steel stud and one or more heat stakes.

5. The load center system of claim 1, wherein the first type of circuit breaker is a one-inch circuit breaker and the second type of circuit breaker is a half-inch circuit breaker.

6. The load center system of claim 1, wherein the primary bus bar and the secondary bus bar are designed to receive a two-pole circuit breaker having half-inch jaw spacing.

7. A load center system for receiving multiple types of circuit breakers, the system comprising:
   a load center;
   a first assembly of a double bus bar arrangement coupled on a first side of the load center, the first assembly including
      a primary bus bar having a plurality of primary stabs, each of the plurality of primary stabs including a single stab for receiving a first circuit breaker, the single stab extending from a primary base portion of the primary bus bar via a primary leg, and
      a secondary bus bar positioned generally in an overlapping position with the primary bus bar, the secondary bus bar having a plurality of secondary stabs, each of the plurality of secondary stabs including a pair of stabs for receiving a pair of second circuit breakers, the pair of stabs extending from a secondary base portion of the secondary bus bar via a secondary leg, the pair of stabs being centered about the single stab of the primary bus bar; and
   a second assembly of the double bus bar arrangement coupled on a second side of the load center, the second assembly including a corresponding primary bus bar and a corresponding secondary bus bar that are generally symmetrical mirror images of the primary bus bar and the secondary bus bar of the first assembly of the double bus bar arrangement.

8. The load center system of claim 7, wherein the first assembly of the double bus bar arrangement and the second assembly of the double bus bar arrangement are mechanically coupled to the load center via a plurality of heat stakes.

9. The load center system of claim 7, wherein the first assembly of the double bus bar arrangement and the second assembly of the double bus bar arrangement are mounted on an interior branch base of the load center, the secondary bus bar being mounted directly to the interior branch base via at least one heat stake, the primary bus bar generally overlapping the secondary bus bar.

10. The load center system of claim 7, further comprising an interior branch base having a plurality of wide phase barriers for separating sets of stabs from one another, each set of stabs including the single stab of the plurality of primary stabs and the pair of stabs of the plurality of secondary stabs.

11. The load center system of claim 7, wherein the secondary base portion of the secondary bus bar is narrower than the primary portion of the primary bus bar, whereby the secondary bus bar fits inside a support feature of an interior branch base.

12. The load center system of claim 7, further comprising an interior insulator for separating sets of stabs from one another, each set of stabs including a single primary stab and two secondary stabs centered about the single primary stab.

* * * * *